(12) United States Patent
Rukavina Mikusic

(10) Patent No.: US 9,080,702 B2
(45) Date of Patent: Jul. 14, 2015

(54) METHOD FOR THE HIGHLY-THICK THERMAL COATING OF JOINTS BY USING ELECTROFUSION IN PIPES USED FOR CONDUCTING FLUIDS, MADE OF STEEL TUBES EXTERNALLY COATED WITH POLYOLEFINS

(76) Inventor: Juan Rukavina Mikusic, Provincia de Bs. As. (AR)

( * ) Notice: Subject to any disclaimer, the term of this patent is extended or adjusted under 35 U.S.C. 154(b) by 751 days.

(21) Appl. No.: 13/265,428

(22) PCT Filed: Apr. 22, 2010

(86) PCT No.: PCT/BR2010/000136
§ 371 (c)(1),
(2), (4) Date: Oct. 20, 2011

(87) PCT Pub. No.: WO2010/121339
PCT Pub. Date: Oct. 28, 2010

(65) Prior Publication Data
US 2012/0031878 A1 Feb. 9, 2012

(30) Foreign Application Priority Data

Apr. 22, 2009 (AR) .................................. P090101411

(51) Int. Cl.
*B29C 65/34* (2006.01)
*F16L 13/02* (2006.01)
(Continued)

(52) U.S. Cl.
CPC .............. *F16L 13/0272* (2013.01); *B29C 63/42* (2013.01); *B29C 65/342* (2013.01); *B29C 65/7841* (2013.01); *B29C 66/1122* (2013.01); *B29C 66/5221* (2013.01); *B29C 66/72321* (2013.01); *B29C 66/81471* (2013.01);
(Continued)

(58) Field of Classification Search
CPC ........... F16L 47/20; F16L 59/20; F16L 58/10; B05D 7/02; B29C 65/34; B29C 66/72321; B29C 66/1122; B29C 66/522; B29C 66/81471; B29C 66/8242; B29C 63/42; B29C 65/342; B29C 65/00; B29C 65/7841; B26D 3/10; B23K 11/00
USPC ..................... 156/272.2, 293, 294; 219/59.1
See application file for complete search history.

(56) References Cited

U.S. PATENT DOCUMENTS 4,929,817 A 5/1990 Mito
5,116,082 A 5/1992 Handa
(Continued)

FOREIGN PATENT DOCUMENTS

| CN | 1817987 | 8/2006 |
|---|---|---|
| CN | 201009144 | 1/2008 |

(Continued)

*Primary Examiner* — Daniel McNally
(74) *Attorney, Agent, or Firm* — Jacobson Holman, PLLC.

(57) ABSTRACT

The present invention relates to a method for the highly-thick thermal coating of joints by using electrofusion in pipes used for conducting fluids, made of steel tubes externally coated with polyolefins, characterized in that it comprises the following steps: a) Placing an anticorrosive coating on the steel pipes to be joined; b) Placing and adjusting the half-round pipes in the connection area of the pipes, and possibly, the linking parts; c) Exerting pressure between the half-round pipes by using compression equipment; d) Connecting the electrical resistances to an external power source; e) Electrofusion welding the adjacent surfaces; f) Cooling and disassembling the compression elements of step c).

5 Claims, 7 Drawing Sheets

(51) Int. Cl.
   *B29C 63/42* (2006.01)
   *B29C 65/78* (2006.01)
   *B29C 65/00* (2006.01)
   *F16L 58/18* (2006.01)
   *F16L 59/20* (2006.01)
   *B29C 35/02* (2006.01)
   *B29C 63/18* (2006.01)
   *B29C 63/22* (2006.01)
   *B29K 23/00* (2006.01)
   *B29K 105/04* (2006.01)
   *B29K 305/12* (2006.01)
   *B29K 309/08* (2006.01)
   *B29L 9/00* (2006.01)

(52) U.S. Cl.
   CPC .......... *B29C 66/8242* (2013.01); *F16L 58/181* (2013.01); *F16L 59/20* (2013.01); *B29C 35/02* (2013.01); *B29C 63/18* (2013.01); *B29C 63/22* (2013.01); *B29C 65/3452* (2013.01); *B29C 65/3468* (2013.01); *B29C 65/3476* (2013.01); *B29C 66/727* (2013.01); *B29K 2023/00* (2013.01); *B29K 2023/06* (2013.01); *B29K 2023/12* (2013.01); *B29K 2105/04* (2013.01); *B29K 2305/12* (2013.01); *B29K 2309/08* (2013.01); *B29K 2995/0049* (2013.01); *B29L 2009/003* (2013.01)

(56) References Cited

U.S. PATENT DOCUMENTS

| | | | |
|---|---|---|---|
| 5,127,116 | A | 7/1992 | Greig |
| 5,685,572 | A | 11/1997 | Linton |
| 5,722,463 | A * | 3/1998 | Smyth et al. ................... 138/170 |
| 5,798,021 | A | 8/1998 | Stiles |
| 6,127,662 | A | 10/2000 | Katz |
| 6,131,954 | A | 10/2000 | Campbell |
| 6,375,226 | B1 | 4/2002 | Dickinson |
| 6,680,464 | B1 | 1/2004 | Carter, Jr. |
| 7,144,045 | B2 | 12/2006 | Krah |

FOREIGN PATENT DOCUMENTS

| | | |
|---|---|---|
| DE | 10353178 | 6/2005 |
| DE | 10353178 A1 * | 6/2005 |
| EP | 1473506 | 11/2004 |
| GB | 2327992 | 2/1999 |
| JP | 08-240295 | 9/1996 |
| WO | WO 2009004377 A2 * | 1/2009 |

* cited by examiner

METHOD FOR THE HIGHLY-THICK THERMAL COATING OF JOINTS BY USING ELECTROFUSION IN PIPES USED FOR CONDUCTING FLUIDS, MADE OF STEEL TUBES EXTERNALLY COATED WITH POLYOLEFINS

This application is a nationalization of International application No. PCT/BR2010/000136, filed Apr. 22, 2010, published in English, which is based on, and claims priority from, Argentina Application No. P20090101411, filed Apr. 22, 2009, both of which are incorporated herein by reference in their entireties.

FIELD OF THE INVENTION

The present invention relates to the coating of steel pipe joints to transport petroleum hydrocarbons previously coated with polyolefin materials (polyethylene or polypropylene). It enables to obtain a high bond level between the material used for the coating of joints and the material with which they were previously coated. More particularly, this method is used for lightly-thick anticorrosion coatings as well as for highly-thick coatings used for pipe thermal insulation.

BACKGROUND OF THE INVENTION

In the art, there are several devices and methods using electrofusion for pipes joints. For instance, the U.S. Pat. No. 7,144,045 relates to an electrofusion joint assembly that includes a meltable part, such as the pipe itself or an intermediate part, and a heating element secured to the pipe. Fasteners are used to secure the heating element which is connected to an external power source.

Another example is the U.S. Pat. No. 6,680,464 that relates to an electrofusion pipe joining control device, wherein the pipes are preferably made of thermoplastic material. It includes a coupling and an arrangement for securing the coupling to the pipes and, at the same time, it defines an electrofusion fusible seal.

Furthermore, the U.S. Pat. No. 6,375,226 relates to a multilayer thermoplastic pipe connector with a hollow tubular coating capable of receiving pipes, elements to create thermal fusion, mechanical fastening elements and sealing elements.

U.S. Pat. No. 6,127,662 relates to a device and method to join a first plastic pipe to a second pipe, which material does not bond properly to the first pipe material, and uses an electrofusion sleeve of a plastic material which bonds properly to the first plastic pipe and includes a first heating coil in contact with the first pipe and a second heating coil in contact with the second pipe. Such sleeve includes, at one end, linking material capable of producing a good bond between the second pipe and the sleeve material.

By way of example, it is worth mentioning the device described in the U.S. Pat. No. 5,798,021; the pipe union system in the U.S. Pat. No. 5,127,116; the electrofusion joints in the U.S. Pat. Nos. 5,116,082 and 4,929,817; or the electrofusion joint mentioned in the Japanese Patent number JP8240295 (A).

None of these patents actually solve the problem of steel pipeline joint coating for lightly-thick anticorrosive coating and for highly-thick thermal coating.

We will introduce a short explanation of the most usual cases found in the art and each of their problems as follows:

1) Lightly-thick anticorrosive coatings: In this case, materials and methods that have satisfactory properties with regard to its bond to the steel surface of the pipes are used. However, in the "overlapping" area using the original coating of said pipes, the best bond levels will not be enough to avoid considering it a critical area causing recurrent failures.

2) Highly-thick coating for pipe thermal insulation: The external coating of steel pipes used for transporting petroleum hydrocarbons in offshore areas using highly-thick polyolefin materials (polypropylene) insulates them, thus maintaining ideal temperature levels which are needed to comply with the conditions related to the flow systems inside.

There is evidence that, up to the moment, an appropriate solution has not been found for joint coating between pipes to guarantee a perfect bond in the interface created by the material used to coat the joint and the coating of the external surface of the pipes.

The materials used at present have different origins, characteristics and associated problems. These can be considered as:

a) Not having polyolefin origin: These materials, in general, do not have the same insulation level as the polypropylene and this is not recommended.

On the other hand, it may not be possible to obtain satisfactory bond levels to the surface of the original coating by using these materials.

In general, elastomeric polyurethanes are used. Even if the application method is fast and does not present major problems, its main disadvantage arises from the limited or almost null bond level to the original polypropylene of the pipes. This does not allow a good water resistant seal, specifically in great depths where hydrostatic pressure obtains considerable values. Therefore, this is not an acceptable solution for most users.

b) Having polyolefin origin: Its application has serious difficulties. It requires a great amount of material mass (related to the coating thickness) applied to high temperature, demanding an excessive cooling period (considered as the difference between the melting temperature and the room temperature). Also, it presents evident problems of contraction and termination. This critical system of mass, temperature, cooling time and contraction create the environment of unfeasibility for its use as an on board ship reference system in offshore area.

By means of the invention, two definitely unique purposes can be achieved:

using, for the joint coatings, the same kind of polyolefin material placed previously in the original coating of the pipes, thus stopping the creation of an interface common among systems where the components are chemically incompatible; and just a small amount of the mass is the one to be heated in order to create a perfect bond between the original coating (already placed in the pipe) and the new one (originated from the joints), definitely establishing a method of unique characteristics that takes into account its safety, a quick performance and equipment simplicity.

BRIEF SUMMARY OF THE INVENTION

The purpose of the present invention is the use of a steel pipeline joint coating method for lightly-thick anticorrosive coating as well as for highly-thick thermal coating that presents the following features:

using the same kind of polyolefins in the steel pipes joints and the original coating thereof;

simplifying method by handling small parts of high temperature material;

reducing the ranges associated to the application and cooling;

achieving the best bond levels in the overlapping areas; applying an electrofusion method.

Electrofusion enables to locally melt just a small part of the whole new applied material and a small part of the original material (coating basis). While both adjacent materials are melting, certain pressure will be exerted on them, forcing the crosslinking of their molecular chains giving a perfect welding.

As the melted material just represents a small part of the whole applied material, its cooling at room temperature will logically be produced in a smaller time range, i.e., in full compliance with the variation of the heated mass amount.

BRIEF DESCRIPTION OF THE DRAWINGS

FIGS. 3A and 3B are both top and sectional views according to A-A shown in FIG. 3A illustrating the cone-shaped linking part whereas FIGS. 3C and 3D are both top and sectional views according to B-B shown in FIG. 3C illustrating the half-round linking part, which are internally provided with the electrical resistances needed for the fusion of the material in its two shapes: half-coned and half-rounded with a flat wing.

DETAILED DESCRIPTION OF THE INVENTION

Figure 1:
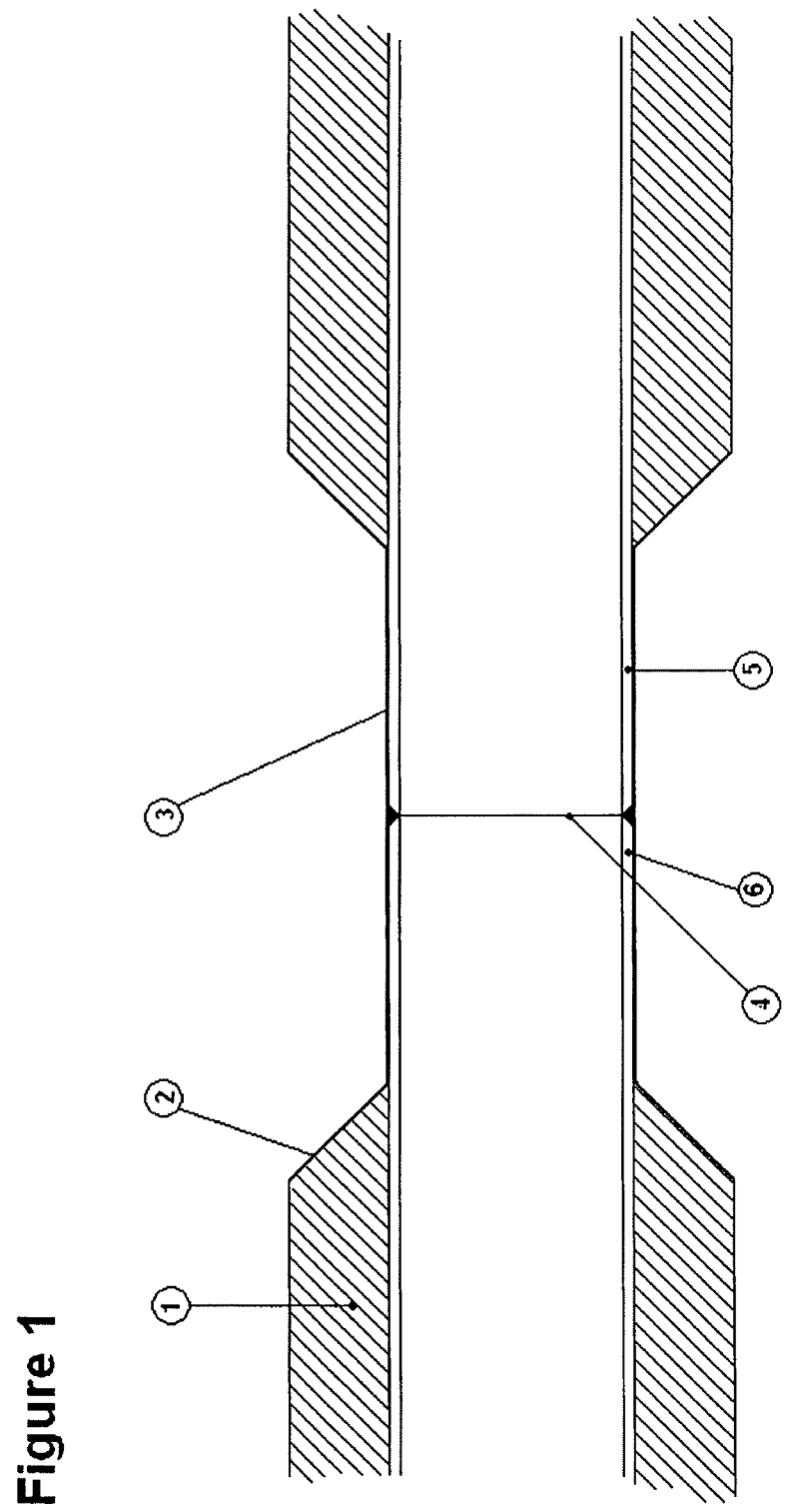
FIG. 1 is a longitudinal sectional view illustrating the welded joint of two steel pipes having highly-thick external coating for thermal insulation. It also illustrates the space in the welded joint area that must be coated to keep the thermal insulation continuity and the coating termination at each pipe end in the shape of a "male" cone.

Below is a detailed description of the invention, with reference to the accompanying figures, which are intended to illustrate it, but without imposing any limitation. The proposed method presents the following alternatives related to each of the two coating types applicable to the pipe joint, such as:
1) thermal insulation, or
2) anticorrosive coating.
1—Highly-thick coating for thermal insulation: The application of this method is suitable for coatings used for the thermal insulation of joints in steel pipes previously coated with highly-thick polypropylene in any of its forms: solid polypropylene, polypropylene loaded with glass hollow microspheres, rigid polypropylene foam, etc. FIG. 1 illustrates two steel pipes 5-6 joined and welded by joint 4 and the ones that present an anticorrosive coating 3 of joint 4 and a highly-thick thermal coating 1 of the steel pipe, including a male cone 2 at the coating end 1, on each pipe.

Figure 2:
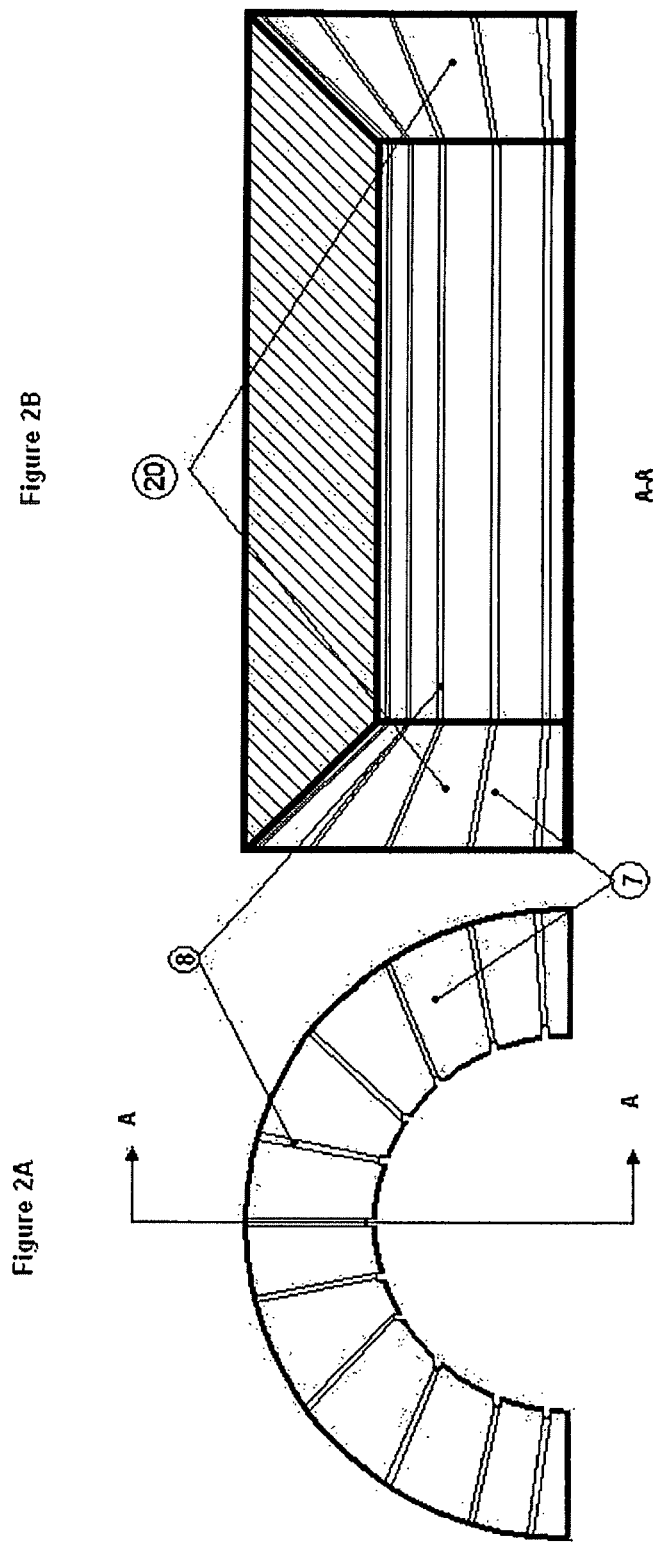
FIGS. 2A and 2B are both top and sectional views according to A-A shown in FIG. 2A illustrating a polypropylene half-round pipe used to complete the thermal insulation coating in the joint area of two welded steel pipes. It also illustrates "female" cones at each end and slots to absorb possible excess of melted material.

After applying the anticorrosive coating of joint 4 in any of the forms used at present time (polypropylene shrinking sleeves or polypropylene powder applied by "flaming technique"), two "half-round" parts 7 (FIG. 2) must be placed and bonded by electrofusion welding. These parts were previously made by an injection or molding method using the same kind of polypropylene applied to the pipe coating. FIG. 2 illustrates slots 8 for the excess of melted material.

Figure 3:
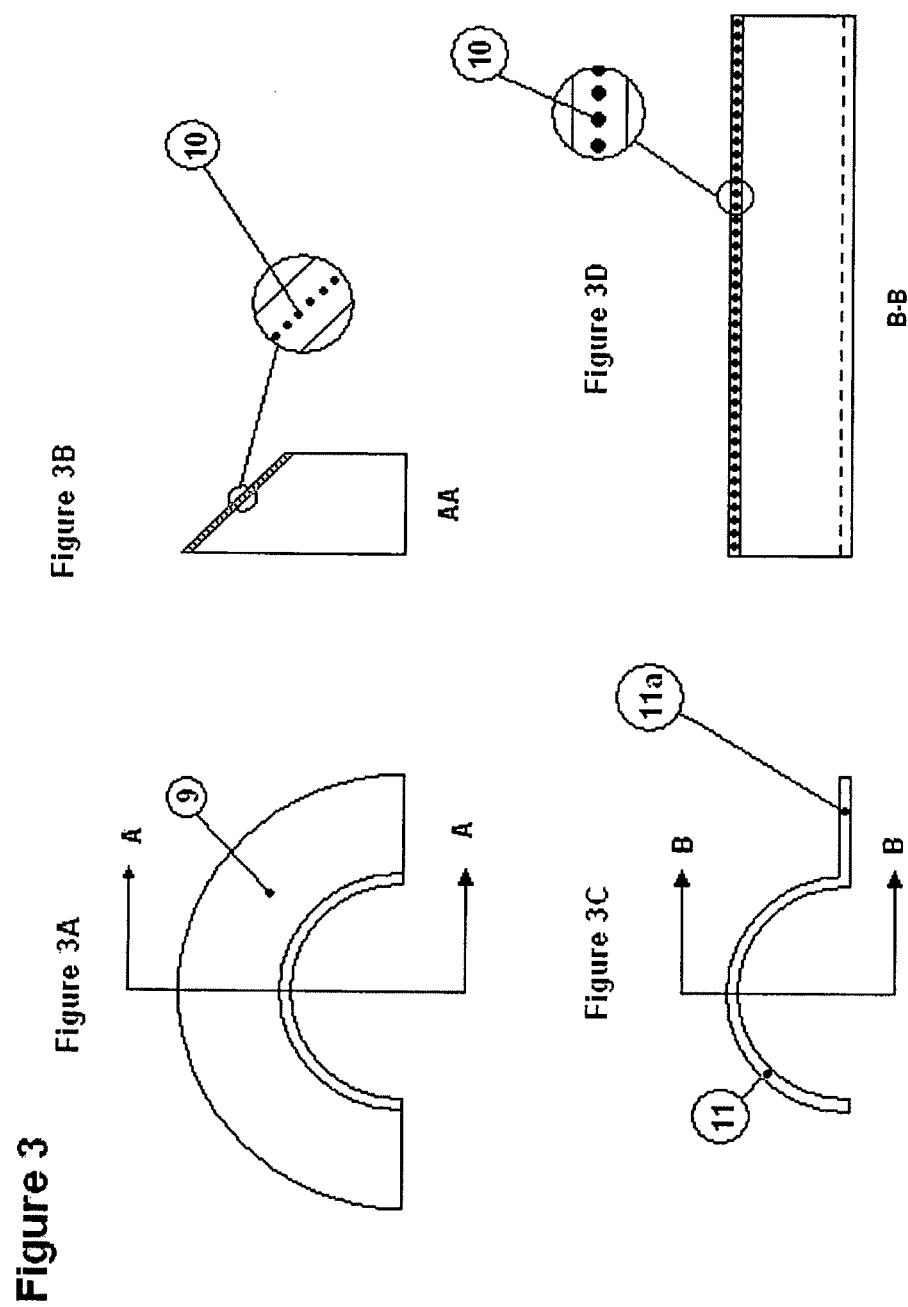

At the same time, two ways are suggested to carry out electrofusion:
A) Using linking parts
B) Not using linking parts
A) Using Linking Parts:

In this case (FIG. 3), the linking parts 9 injected or molded in polypropylene have internal electrical resistances 10. When connected to their respective power sources (not illustrated), these will make the fusion of the adjacent material possible. The geometry of these linking parts allows its adaptation to the contact surfaces between the half-round pipes and the original pipe coating.

That is to say, two linking parts 9 are places at each end where the previous pipe coating ends in a "male" cone shape 2. These are two half cones (FIG. 3) that allow the coating of the whole surface.

Figure 4:
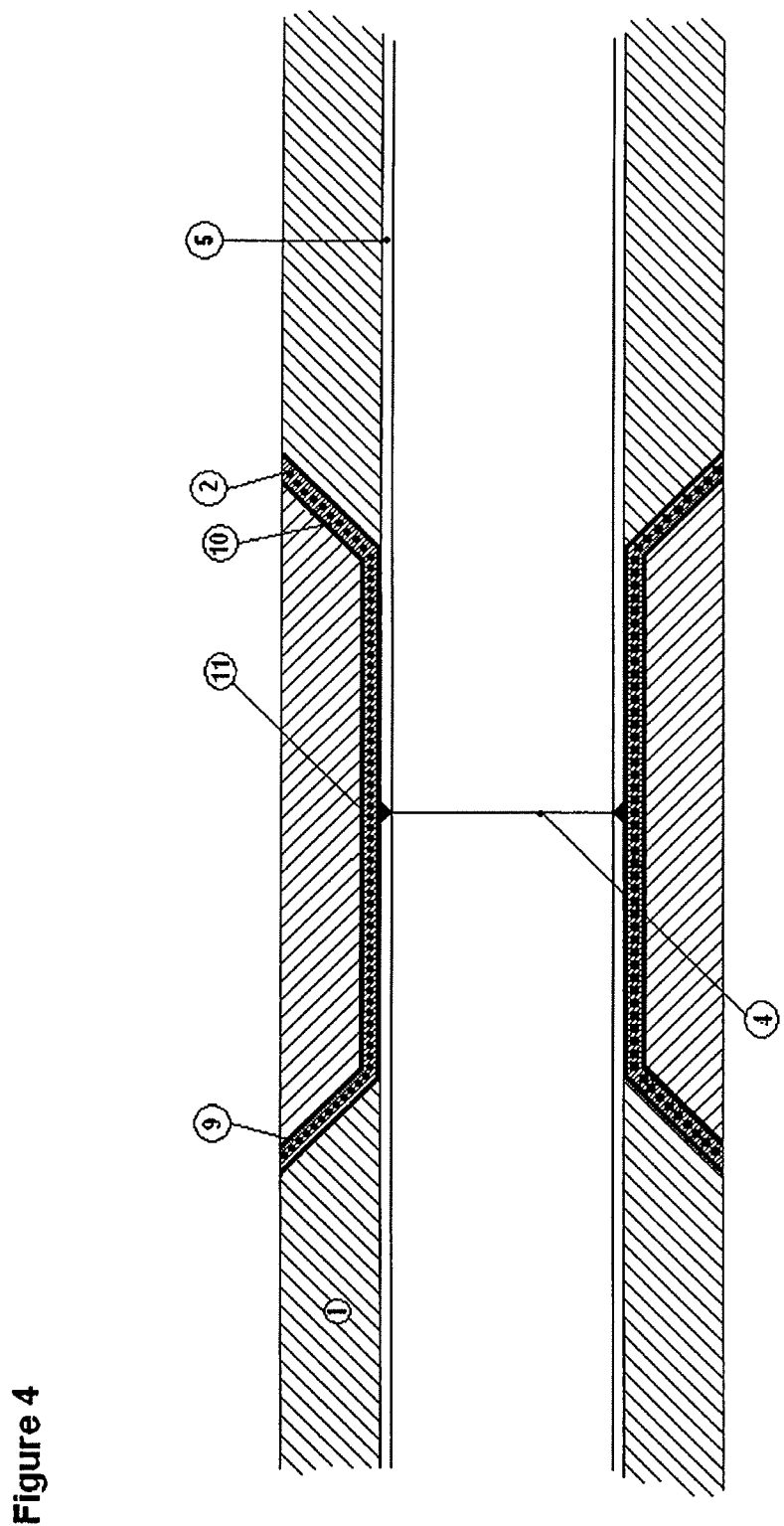
FIG. 4 is a longitudinal view of the joint of two steel pipes with two placed and welded polypropylene half-round pipes, completing the highly-thick coating for thermal insulation in said area.

The highly-thick half-round pipes will end in a "female" cone shape 20, thus allowing the linking parts to be perfectly placed in the empty space left between both cones: the male cone 2 of the original coating and the female cone of the highly-thick half-round pipes (FIG. 4).

Figure 5:
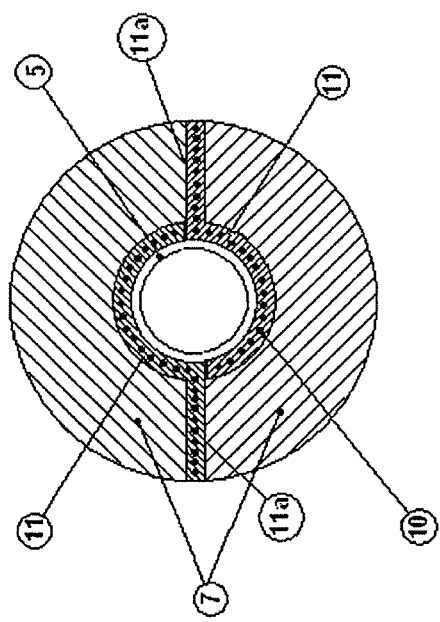
FIG. 5 is a cross-sectional view of the area in which the two polypropylene half-round pipes have been placed and welded by electrofusion. It also illustrates the half-round linking parts and the flat wing needed for the welding of the flat parts of the highly-thick polypropylene half-round pipes.

In the cylindrical area of the joint (the pipe area in which the anticorrosive coating was previously applied), the linking parts 11 are placed, having half-rounded shape in this case (they are highly thick and have internal electrical resistance). A perpendicular flat wing 11a is fixed to one of the longitudinal ends (FIG. 3C). This wing 11a is the one capable of carrying out the welding in the longitudinal flat sides of the highly-thick half-round pipes (FIG. 5).

Figure 6:
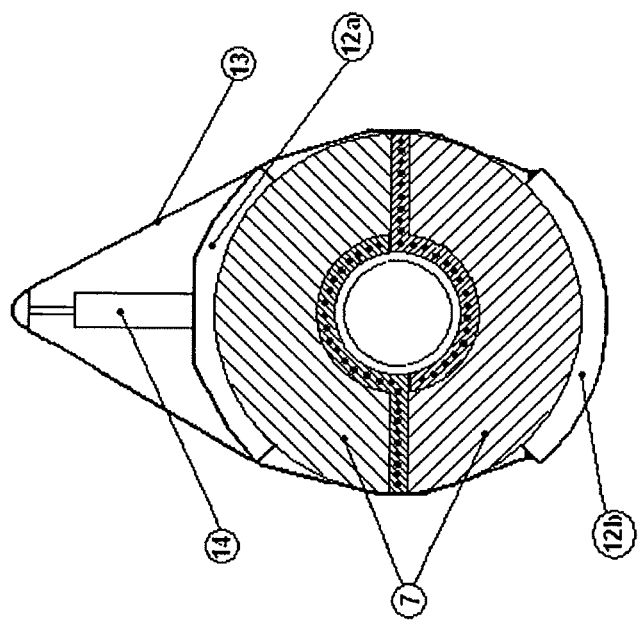
FIG. 6 is a cross-sectional view illustrating the compression device formed by two concave elements, a hydraulic cylinder and a girdle. These can exert the pressure necessary to adjust both highly-thick polypropylene half-round pipes to the steel pipe, and finally.

After the whole system was set up, it needs to be provided with a certain pressure so that, once the material is melted, is allows the crosslinking of the molecular chains. This is carried out by a system formed by two concave fasteners 12a-12b adaptable to the outer diameter of the highly-thick half-round pipes 7 and joined to one another by a girdle 13 linked to a hydraulic cylinder 14 that generates pressure (FIG. 6).

The following step consists in connecting the ends of the resistances 10 to the power source (not illustrated). The current intensity and the heating time for each linking part are previously settled, thus obtaining the melting temperature of such parts together with the surfaces of the half-round pipes 7 and the original coating of the pipes.

The pressure exerted by the hydraulic cylinder 14 over the whole system will enable the crosslinking of the polyolefin chains, which is essential for obtaining a monolithic final product at room temperature. This pressure will continue to be exerted once the electrofusion is finished and until the melted material recovers the room temperature initial conditions.

The surfaces of the half-round pipes 7 in contact with the linking parts have a specific number of slots and/or perforations 8 (FIG. 2A). Its aim is to absorb the potential excess of melted material that these pieces create and to carry out the final adjustment (based on the differences arising from the tolerances in the pipe coating method) between the highly-tick half-round pipes and the hollow to be covered.

B) Not Using Linking Parts:

In this embodiment, the half-round pipes 7 have already been fitted with electrical resistances 10, thus making it unnecessary to use linking parts. This turns out to be an important alternative when the dimensional hollow tolerances to be covered are fulfilled according to the coating specifications of the plant and, as a consequence, the half-round pipes perfectly adapt to it.

To summarize, the placement method is similar to the one previously established:

Anticorrosive coating;
Half-round pipes 7 placement and adjustment;
Compression equipment installation (FIG. 6);
Connection of resistances 10 to the power source;
Adjacent surfaces fusion welding;
Cooling and disassembling of the compression system.

2—Lightly-Thick Coating for Anticorrosive Protection:

The object of this alternative embodiment of the present invention is to introduce an improvement on the application of the so-called thermal shrinkable sleeves used in the art for the coating of joints of steel pipes coated with polyolefins, whether of polyethylene or polypropylene.

These sleeves have a high bond level to the steel pipe surface, but not to the pipe coating in the "overlapping area".

The improvement consists in using the electrofusion method (FIG. 7) in that area in order to achieve an ideal bond level. In order to achieve this, a linking part 15 is placed between the pipe 5 coating 18 and the thermal shrinkable sleeve 16 in the contact area with the original polyolefin coating pipe, before applying the sleeve shrinking method. This linking part 15, which has been fitted with an electrical resistance 17, can have a cylindrical or half-rounded shape, with an inner diameter equal to the outer diameter of the coated pipe, and is, in general, 50 mm long.

Once the sleeve 16 application procedure is finished, i.e., once the thermal shrinkage is performed, the linking part 15 gets "stuck" between the thermal shrinkable sleeve 16 and the pipe 5 coating 18. It is connected to the power source enabling the fusion of the whole system: the linking part, the outer surface of the pipe coating and the inner surface of the sleeve.

Figure 7:
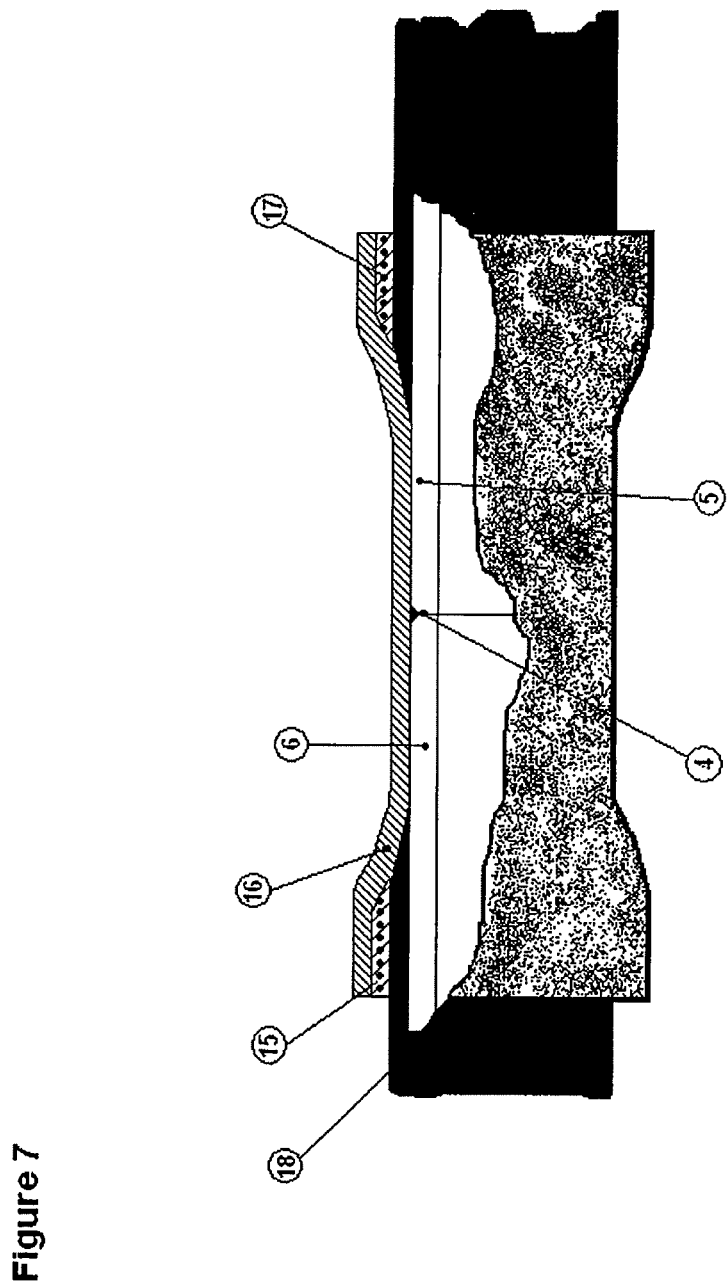
FIG. 7 is a longitudinal view illustrating the way to improve the application of thermal shrinkable sleeves as lightly-thick anticorrosive coating in a pipe joint. This is made by putting a linking part to create electrofusion between the sleeve and the pipe coating.

Once the fusion method is completed, the source is disconnected enabling the heat dissipation needed for the system to stabilize at room temperature again. Naturally, this electrofusion welding procedure takes place at both ends of the thermal shrinkable sleeve 16, i.e., the overlapping area with each of both steel joined pipes 5-6 (FIG. 7).

In short, the present invention relates to a method for the coating of joints by using electrofusion in pipes used for conducting fluids, made of steel pipes externally coated with polyolefins. This method comprises the following general concepts:

1) Using the same type of polyolefins in the steel pipe joints and their original coatings, thus avoiding the creation of an interface that is typical of the systems where the components are chemically incompatible;

2) Heating by means of electrofusion small parts of overlapped material at high temperature;

3) Reducing the ranges associated to the application and cooling;

4) Increasing the bond level between the material used for coating the joint and the original coating of the pipes.

More specifically, the method proposed for the highly-thick thermal coating includes the following steps:
a) Applying an anticorrosive coating on the steel pipes to be joined;
b) Placing and adjusting the half-round pipes and the linking parts, as applicable, to the connection area of the pipes;
c) Exerting pressure between the half-round pipes by using compression equipment (FIG. 6);
d) Connecting the electrical resistances 10 to an external power source;
e) Fusion welding the adjacent surfaces;
f) Cooling and disassembling the compression elements of step c).

Whereas the method for the lightly-thick anticorrosive coating includes the following steps:
a) Placing the linking parts;
b) Placing and applying the thermal shrinkable sleeves;
c) Connecting the electrical resistances to the power source;
d) Fusion welding the adjacent surfaces; and
e) Cooling the whole system.

The invention claimed is:

1. A method for a highly-thick thermal coating of joints by using electrofusion in steel pipes used for conducting fluids, made of steel tubes externally coated with polyolefins coating, comprising the following steps in the following order:
   a) placing an anticorrosive coating on the steel pipes to be connected, and co-axially connecting the steel pipes;
   b) placing two sectionally half-round pipes around a connection area of the steel pipes;
   c) exerting pressure between the half-round pipes by using compression equipment;
   d) connecting electrical resistances to an external power source;
   e) electrofusion welding the connection area; and
   f) cooling and disassembling the compression equipment of step c);
   wherein:
      the two sectionally half-round pipes have an inner radius and an outer radius, the inner radius being equal to an outer radius of the steel pipes coated with anticorrosive coating, and the outer radius of the two sectionally half-round pipes is equal to the outer radius the steel pipe plus thickness of the polyolefins coating;
      ends of each of the two sectionally half-round pipes are in conical shape to adapt to geometry of the polyolefins coating;
      the two sectionally half-round pipes have electrical resistances on an inner surface of the two sectionally half-round pipes in contact with the anticorrosive coating of the steel pipes, on the conical shaped ends which are in contact with the polyolefins coating of the steel pipes, and on contact surfaces between each of the two sectionally half-round pipes.

2. The method for coating joints according to claim 1, wherein the anticorrosive coating is polypropylene thermal shrinkable sleeves, or polypropylene powder applied by a flaming technique.

3. The method for coating joints according to claim 1, wherein linking parts are provided between the two sectionally half-round pipes and the steel pipes; and wherein the linking parts are made of polypropylene and have internal electrical resistances connected to power sources capable of carrying out electrofusion.

4. The method for coating joints according to claim 1, wherein the compression equipment is formed by two concave fasteners adaptable to an outer diameter of the two sectionally half-round pipes and joined by a girdle linked to a hydraulic cylinder that generates pressure.

5. The method for coating joints according to claim 3, wherein each of the linking parts has a shape of a sectionally half-circle with a perpendicular flat wig at one end of the half-circle.

* * * * *